United States Patent

[11] 3,556,463

| | | |
|---|---|---|
| [72] | Inventor | John G. Williams<br>Warren, N.J. |
| [21] | Appl. No. | 765,885 |
| [22] | Filed | Oct. 8, 1968 |
| [45] | Patented | Jan. 19, 1971 |
| [73] | Assignee | Worthington Corporation<br>Harrison, N.J.<br>a corporation of Delaware |

[54] TRIP VALVE SYSTEM
31 Claims, 4 Drawing Figs.

[52] U.S. Cl. .................................................... 251/14,
251/25, 251/47, 251/86
[51] Int. Cl. ............................................... F16k 31/143,
F16k 25/00
[50] Field of Search .......................................... 251/25, 50,
36, 42, 47, 86

[56] References Cited
UNITED STATES PATENTS

| 338,771 | 3/1886 | Page | 251/25 |
|---|---|---|---|
| 1,077,503 | 11/1913 | Anderson | 137/629X |
| 1,201,425 | 10/1916 | Anderson | 251/36X |
| 1,891,374 | 12/1932 | Ehemann | 251/86X |
| 2,146,092 | 2/1939 | Raymond | 251/50X |
| 2,307,628 | 1/1943 | Ludemann | 251/36 |
| 2,849,019 | 8/1958 | Oliveau | 251/25X |

*Primary Examiner*—Arnold Rosenthal
*Attorney*—Daniel H. Bobis

ABSTRACT: A combined automatic and manual steam supply valve for a steam turbine in combination with a pilot valve for automatically closing the supply valve responsive to turbine shaft overspeed, high bearing temperature or abnormal exhaust pressure. The automatic shutdown device is capable at all times of overriding the manual control and the supply valve can be reset without shutting off the steam supply upstream of the valve.

PATENTED JAN 19 1971
3,556,463
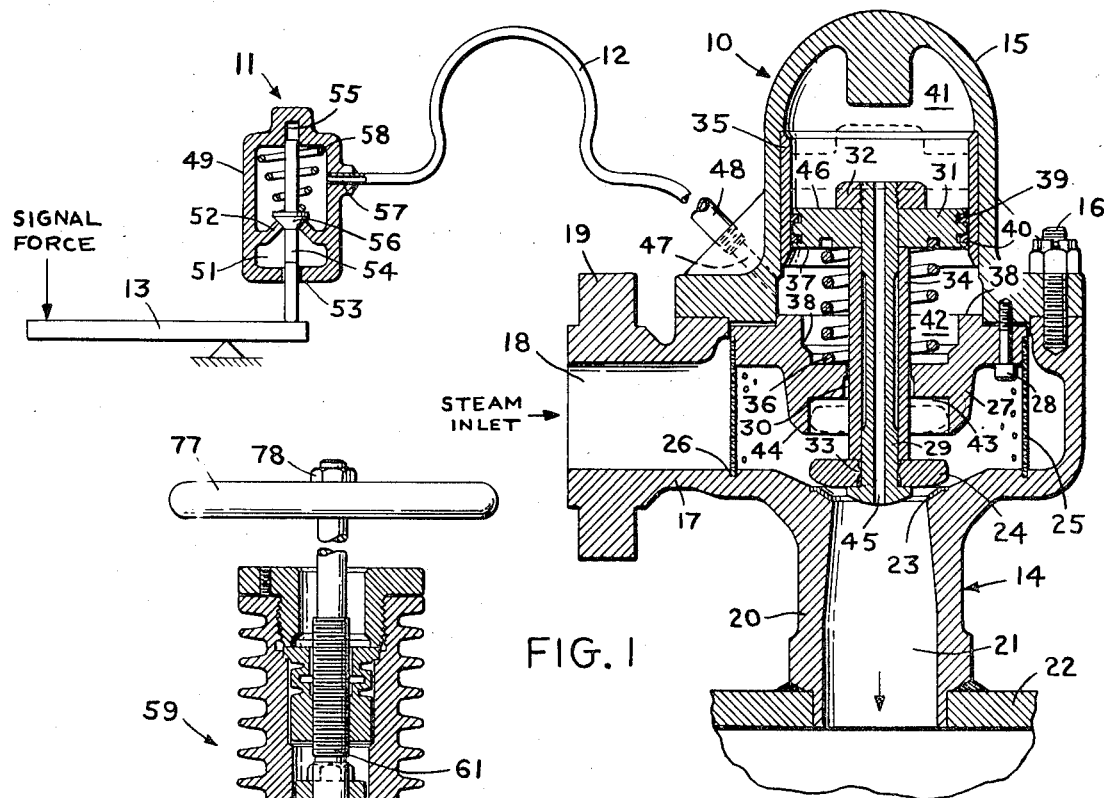
FIG. 1
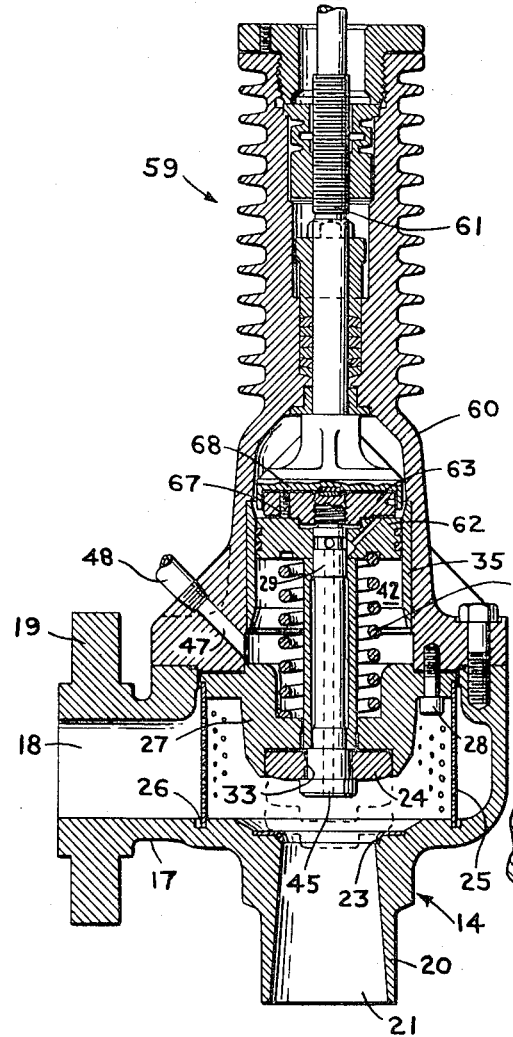
FIG. 2
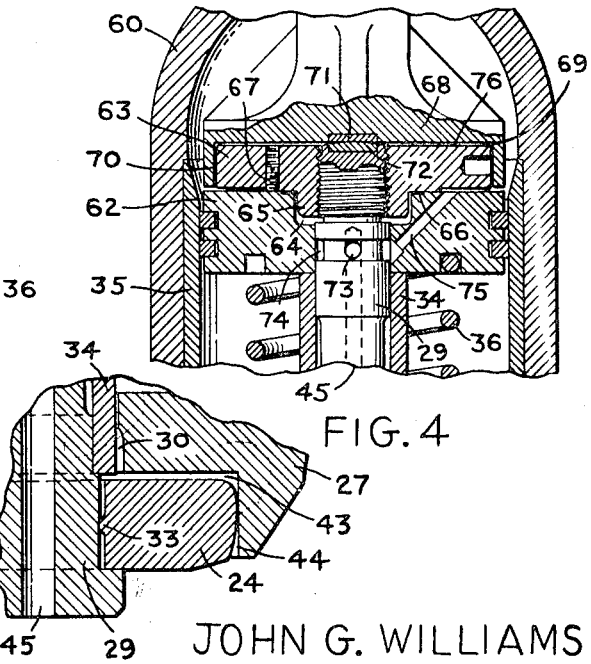
FIG. 4
FIG. 3
JOHN G. WILLIAMS
INVENTOR.
BY Daniel H. Bobis
Atty

TRIP VALVE SYSTEM

BACKGROUND OF THE INVENTION

This invention relates generally to steam turbines and more particularly to a pilot-operated trip valve for stopping the flow of steam to the turbine automatically under adverse operating conditions.

Trip valves actuated by a signal device responsive to turbine shaft overspeed, high bearing temperature, abnormal exhaust pressure, etc. which can subsequently be reset without shutting off the steam supply by means of a valve located upstream of the turbine are well known in this art. Trip valves having these features and which can also be manually opened or closed with the automatic shutdown device being capable of overriding the manual control at all times are also well known.

One of the problems heretofore encountered in trip valve systems having these features is the large inertial forces created in the valve due to the speed at which the valve opens. This will cause parts of the valve assembly such as the shaft, cover, valve head, and shaft sleeve to become stressed which results in eventual failure.

Another problem is that due to thermal distortion and due to the valve stem not being concentric with the axis of the valve seat the valve head cannot close tightly.

A further problem in pilot-operated trip valves is that foreign matter such as dirt, scale, or weld spatter carried into the trip valve by the inlet steam can clog control orifices thereby reducing the efficiency of the valve or causing the valve to become inoperative.

The present invention overcomes the problem of the large inertial forces produced upon sudden opening of the valve by providing a trip valve having unique structure in which the valve head, in combination with a close clearance ring acts as a snubber to generate a force to oppose the large inertial forces developed in the valve upon sudden opening thereof.

The problem of the valve head not closing tightly is overcome by providing a valve head which can move angularly about a pivoting center on the shaft axis, in combination with a flat valve-seating surface, thus allowing the valve head to close tightly even though the seating surface is out of square with the shaft axis due to thermal distortion.

A steam strainer located within the valve body and surrounding the valve mechanism prevents large dirt particles from passing into the valve mechanism. Small dirt particles which might clog control orifices are removed from these areas by motion of the valve shaft or by pressure reversal during valve operation due to the unique construction of the valve which will be made clear in the description.

PRIOR ART

Pertinent prior-art patents are C. A. Schellens U.S. Pat. No. 2,821,927; E. V. Anderson U.S. Pat. No. 1,077,503; and F. Hennebohle U.S. Pat. No. 974,266.

Schellens teaches an emergency control for shutting off the supply steam in case of shaft overspeed or if the bearing lubricating oil fails. Means are also provided to manually open and close the valve. This system contains a main or trip valve and a pilot valve as does the present invention, however, the pilot valve operates to allow more or less oil pressure into a cylinder containing a piston and movement of the piston acts directly on the main valve stem to open and close the valve.

In contrast, the pilot valve of the subject disclosure operates to reduce steam pressure acting on one face of a piston head located in the trip valve thereby allowing the piston to move down and the valve head to engage the valve seat.

The E. V. Anderson patent discloses an arrangement whereby the valve is automatically closed by disturbing the pressure equilibrium existing in the normally open position in response to engine overspeed. A pilot valve actuated by the overspeed allows for exhausting of the steam pressure in chamber 19 of the trip valve.

While the basic principal of the subject invention is similar in operation, the structure of the trip valve is substantially different.

F. Hennebohle U.S. Pat. No. 974,266 discloses a valve having a chamber or cylinder, a piston fitting in the cylinder, and a valve member secured to a valve stem for movement with the stem. The chamber or cylinder is filled with steam at substantially the same pressure as the steam in the inlet of the valve to hold the valve head in the open position. When the pressure in the cylinder is reduced the unbalanced pressure across the piston head will cause the valve head to seat thereby closing off the supply of steam.

The present invention differs from Hennebohle in that means are provided whereby a valve head in combination with a close clearance ring, acts to oppose the large valve assembly inertial forces created by the sudden opening of the valve. Further, means are provided, within the valve body, to screen out large dirt particles entrained in the inlet steam.

SUMMARY OF THE INVENTION

Thus, the present invention covers a trip valve of unique structure wherein the valve mechanism comprises in combination a valve stem, a piston head disposed about the upper end of the stem for vertical movement therewith, a valve head disposed about the lower end of the stem for vertical movement therewith, a valve stem sleeve disposed about the valve stem between the piston head and valve head, a valve stem guide for guiding the vertical travel of the stem and a spring disposed between the piston head and the valve stem guide to bias the mechanism to the normally open position.

A steam strainer is disposed within the valve body, about the valve mechanism to prevent large dirt particles from passing to the valve mechanism.

The valve head, in combination with the valve stem guide, acts as a snubber to generate a force which will oppose the large inertial forces created on the valve by the sudden opening or closing of the valve thereby decreasing the stress on the valve head, stem, stem sleeve, and stem guide.

The valve seat surface is made flat to accommodate the valve head which can move angularly about a pivoting center on the valve stem axis thereby allowing the valve to close tightly even though the seating surface may be out of square with the valve stem axis due to thermal distortion.

Accordingly, it is an object of this invention to provide a trip valve system for stopping the flow of steam to a steam turbine under adverse operating conditions.

Another object of the invention is to provide a trip valve which can be both manually and automatically operated.

Another object of the invention is to provide a combined automatic and manually controlled trip valve wherein the automatic control is capable of overriding the manual control at all times.

Still, another object of the invention is to provide a trip valve wherein the stress on parts of the valve mechanism due to large inertial forces is greatly reduced.

Another object of the invention is to provide a trip valve wherein the valve mechanism is protected from damage due to foreign matter entrained in the inlet steam.

A further object of this invention is to provide a trip valve wherein positive seating of the valve head on the valve seat is assured.

These and other objects and advantages of the invention are believed made clear by the following description thereof taken in conjunction with the accompanying drawings wherein:

IN THE DRAWINGS

FIG. 1 is a vertical section of the automatic trip valve and pilot valve of the invention.

FIG. 2 is a vertical section of the combined automatic and manual trip valve.

FIG. 3 is an exploded section of the valve head, valve stem guide, and valve stem of FIGS. 1 and 2.

FIG. 4 is an exploded section of the valve cover, valve stem and piston head of FIG. 2.

Referring now to FIG. 1, the automatic trip valve system of the invention is shown comprising a trip valve generally designated 10 and a pilot valve generally designated 11 to associated therewith through a conduit 12 for actuating the trip valve, and means shown schematically as a pivot lever 13 responsive to shaft overspeed, high bearing temperature, abnormal exhaust pressure, etc., operatively associated with pilot valve 11 for opening the pilot valve.

The automatic trip valve 10 shown in FIG. 1 comprises a right elbow shaped lower half referred to as valve body 14 and a dome shaped upper half referred to as valve body cover 15 secured to valve body 14 by a plurality of bolts 16.

Valve body 14 comprises a horizontally extending cylindrical inlet port 17 having an inlet passage for steam 18 formed therein and a flange 19 formed integrally thereon for connection to a steam supply pipe (not shown). Formed at right angles to inlet port 17 is a vertically extending cylindrical outlet port 20 having an outlet passage for steam 21 formed therein and a flange 22 formed thereon for connection to the steam chest of a steam turbine (not shown).

The end of outlet passage 21, remote from the steam chest, is chamfered to receive a replaceable flat valve seat 23 which is secured thereto in any suitable manner such as will be familiar to those skilled in this art. A valve head 24, forming part of a valve mechanism to be subsequently described, is dimensioned to engage valve seat 23, thereby sealing off outlet passage 21 from inlet passage 18 under certain operating conditions and thus stopping the flow of steam to the steam turbine all as will be described in greater detail below.

A circular perforated screen 25 which acts to prevent large dirt particles, pipe scale or weld spatter entrained in the inlet steam, from contacting the valve mechanism, or being passed to the steam chest is disposed within valve body 14 and held in position by a circular groove 26 formed in valve body 14 perpendicular to outlet passage 21.

Disposed within the cavity or fluid chamber formed by valve body 14 and valve body cover 15 is the valve mechanism previously referred to comprising: a valve stem guide 27 secured by bolt 28 to valve body cover 15; valve stem 29 extending vertically and coaxial with outlet passage 21 through an opening 30 in guide 27 into valve body cover 15; piston head 31 disposed about and fixedly connected to valve stem 29 at the upper end thereof and secured thereto by a piston nut 32 threadably engaging valve stem 29; valve head 24 disposed about valve stem 29 on a pivoting center 33, parallel to an axially spaced from piston head 31; valve stem sleeve 34 disposed about and fixedly connected to valve stem 29 in the space between piston head 31 and valve head 24; a replaceable piston head cylinder 35 disposed within the valve body cover 15 and secured thereto in any suitable manner; and a spring 36 disposed about sleeve 34 engaging at one end the inboard face 37 of piston head 31 and at the other end the inboard surface 38 of guide 27.

Disposed within circumferential grooves 39 of piston head 31 are piston rings 40 for slidably engaging piston head cylinder 35 thus allowing vertical travel of the piston head 31 while maintaining a seal between upper chamber 41 and spring chamber 42 for purposes to be more fully described under "Operation."

With the valve in a normally open position such as indicated by the dotted lines in FIG. 1, valve head 24 is disposed within annular recess 43 in guide 27 which is dimensioned to provide clearance 44, as small as tolerance stack-ups will permit, between adjacent surfaces of guide 27 and valve head 24.

Thus, with the valve in the open position inlet steam pressure is permitted to pass through clearance 44, opening 30 in guide 27, and into spring chamber 42 where it acts against inboard face 37 of piston head 31. The steam inlet pressure is also transmitted to upper chamber 41 through bore 45 extending the length of valve stem 29 where it acts on outboard face 46 of piston head 31. With the pressure thus equal on both faces of piston head 31 spring 36 exerts enough force to bias the valve head vertically upward thus keeping the valve open.

An opening 47 in valve body cover 15 extends into spring chamber 42 and is fitted within adapter 48 for receiving conduit 12 which communicates at its other end with pilot valve 11 which functions to vent spring chamber 42 to the atmosphere automatically under adverse operating conditions such as turbine shaft overspeed, high bearing temperature, low lube oil pressure etc., as will be described under "Operation."

PILOT VALVE

The pilot valve 11 comprises a generally cylindrical member 49 having an upper and lower fluid chamber 50 and 51 formed therein separated by a valve port 52 formed integrally therewith.

Extending through an opening 53 in cylindrical member 49 and into lower and upper fluid chambers 51 and 50 through port 52 is a pilot valve shaft 54 dimensioned to slidably engage annular recess 55 formed in the top of member 49.

Disposed about pilot valve shaft 54 in upper fluid chamber 50 for vertical movement with the shaft is a valve head 56 dimensioned to engage valve port 52 thereby preventing communication of the upper chamber with the lower chamber in this normally closed position.

The lower end of pilot valve shaft 54 is in communication with a device such as pivoted lever 13 for imparting vertically upward movement to the valve shaft 54 and hence the valve head 56 in response to a signal force applied thereto.

An opening 57 through cylindrical member 49 extends into upper fluid chamber 50 for receiving conduit 12 as previously mentioned under "Trip Valve" thereby communicating the upper fluid chamber 50 of pilot valve 11 with spring chamber 42 of trip valve 10.

A spring 58 disposed about pilot valve shaft 54 in upper fluid chamber 50 acts to bias the valve head 56 against valve port 52 when no signal force is acting on lever 13 thus preventing the escape of steam from spring chamber 42 of trip valve 10.

COMBINED AUTOMATIC AND MANUAL TRIP VALVE

Referring now to FIGS. 2 and 4 the combined automatic and manual trip valve of the invention is shown generally at 59 wherein the valve body cover 15 of FIG. 1 is replaced by a standard valve bonnet 60 having a jackshaft 61 extending therethrough, and the piston head 31 and piston nut 32 of FIG. 1 are replaced by lower piston head 62 and upper piston head 63 respectively.

Lower piston head 62 has an annular recess 64 formed therein for receiving hub portion 65 of upper piston head 63 which threadably engages valve stem 29 for vertical movement therewith. A hardened washer 66 is provided between the upper and the lower piston heads to permit relative rotation between the two upon assembly without damaging their surfaces and a set screw 67 prevents relative rotation between the two after assembly and during operation.

A piston snubber 68 fixedly connected to jackshaft 61 for advancement therewith has an annular recess 69 formed therein dimensioned to receive upper piston head 63 with a small radial clearance 70 for purposes to be fully described under "Operation."

Hardened washers 71 and 72 are pressed on or otherwise secured to snubber 68 and valve stem 29 to prevent the upper piston head 63 and piston snubber 68 from contacting upon sudden opening of the valve and thereby damaging their respective surfaces.

In this embodiment of the invention center bore 45 in valve stem 29 is intersected by a radial hole 73 near the upper end of valve stem 29 which permits the steam pressure existing below valve head 24 at any given time to be transmitted to a recess 74 formed on valve stem 29 which in turn communicates with angularly drilled hole 75 in upper piston head 63. As best seen in FIG. 4 the steam pressure can thus be communicated to outboard face 76 of upper piston head 63 through radial clearance 70 between the upper piston head and the piston snubber 68.

A hand wheel 77 is disposed about the upper end of jackshaft 61 and secured thereto by nut 78 threadably engaging the shaft. When the hand wheel is turned to advance the jackshaft 61 vertically downward a force is exerted on upper piston head 63 through snubber 68 and thus to lower piston head 62 forcing it to a vertically lower position in cylinder 35. Since valve head 24 is also secured to valve stem 29 it is caused to move vertically downward thereby partially obstructing or throttling the steam supply to the turbine. The throttled position of valve head 24 is shown by the dotted line in FIG. 2.

As with the automatic trip valve 10 of FIG. 1 the combined manual and automatic trip valve 59 of FIG. 2 is in communication with pilot valve 11 which functions to vent spring chamber 42 to atmosphere automatically thus allowing the valve head 24 to engage valve seat 23 thereby stopping the flow of steam to the turbine.

OPERATION

Referring first to the automatic system only of FIG. 1 and starting with the pilot valve 11 in a closed position as shown and the trip valve 10 in the opened position as shown by the dotted lines, steam enters the valve from a supply line (not shown) and flows through inlet passage 18 and out outlet passage 21 to the steam turbine (not shown).

With the trip valve in this open position steam flows through clearance 44 between the valve head 24 and guide 27 and through opening 30 in guide 27 thus filling spring chamber 42. At the same time steam will flow through bore 45 in valve stem 29 and fill upper chamber 41. With the steam pressure thus balanced on both faces 37 and 46 of piston head 31, and on both faces of valve head 24, spring 36 will bias the valve mechanism open as shown by the dotted lines.

When, due to excess turbine shaft speed, high bearing temperature, or low lubricating oil pressure a signal force is applied to lever 13, valve shaft 54 and valve head 56 of pilot valve 11 are caused to move vertically upward thus allowing upper fluid chamber 50 to communicate with lower fluid chamber 51 and thus with the atmosphere through opening 53 in cylindrical member 49.

The signal force applied to pivoted lever 13 to actuate pilot valve 11 can be applied manually or automatically by any suitable mechanical, pneumatic, hydraulic or electrical means responsive to the abnormal system-operating conditions mentioned above. For example, a typical excess-speed trip familiar to those skilled in this art, employing a spool piece and spring operatively associated with the turbine shaft can be employed wherein the centrifugal force caused by the shaft rotation causes the spool piece to overcome the preset spring force causing the spool piece to move radially outward striking the lever 13.

Also, it is possible to actuate the pilot valve in response to any system parameter which can be converted to an electric signal by attaching a solenoid to the end of lever 13.

With the pilot valve 11 in this open position the steam in spring chamber 42 of trip valve 10 will flow out through conduit 12 and to the atmosphere after passing through pilot valve 11. With the pressure on inboard face 37 of piston head 31 thus reduced below that of the pressure on outboard face 46 the valve mechanism will move vertically downward and valve head 24 will engage valve seat 23 thereby stopping the flow of steam to the turbine.

When the signal force is removed from lever 13 spring 58 of pilot valve 11 will bias valve head 56 against valve port 52 thereby stopping steam flow to the atmosphere. Steam pressure will build in spring chamber 42 of trip valve 10 and the valve mechanism will move vertically upward thereby allowing steam to again flow to the steam turbine.

The valve mechanism of trip valve 10 will move from the fully closed to the fully open position very rapidly thus creating large inertial forces. Valve head 24 in combination with annular recess 43 in guide 27 acts as a snubber to generate a force which will oppose these large inertial forces.

Steam at inlet pressure is trapped and compressed by the valve head 24 as it approaches annular recess 43 of guide 27 creating a pressure high enough such that sufficient force is developed to oppose the valve mechanism.

Referring now to the combined automatic and manual trip valve 59 of FIG. 2, hand wheel 77 can be turned to advance the jackshaft 61 to any desired position thereby lowering valve head 24 as shown by the dotted lines. With the valve head in any position the automatic control can override the manual control to close the valve thereby shutting off the supply of steam to the steam turbine.

With the valve head in any position inlet steam will flow through clearance 44 between the valve head 24 and guide 27 and through opening 30 in guide 27 thus filling spring chamber 42 all as previously described for the automatic-only valve of FIG. 1. At the same time steam will flow through bore 45 and valve stem 29, through radial hole 73 into recess 74 on valve stem 29 and then through drilled hole 75 in upper piston head 63. Through small radial clearance 70 between upper piston head 63 and piston snubber 68 the steam pressure can thus be communicated to outboard face 76 of the upper piston head thereby balancing the pressure in spring chamber 42.

When spring chamber 42 is evacuated through pilot valve 11 as already described for the automatic-only valve, the valve mechanism will move vertically downward as previously described thereby stopping the flow of steam to the turbine.

When the pilot valve is closed and the pressure in spring chamber 42 is increased the valve mechanism will move vertically upward only to the extent that jackshaft 61 is withdrawn Since the valve head cannot move to the fully opened position if the jackshaft is not fully withdrawn the snubbing effect created by the valve head 24 approaching recess 43 in guide 27 is ineffective.

However, when upper piston head 63 approaches annular recess 69 formed in piston snubber 68 steam is trapped and compressed creating a force sufficient to oppose the valve mechanism. Thus, in the combined automatic and manual trip valve there are two snubbers; one is effective when the jackshaft is fully withdrawn and the other when the valve is in a throttled position.

Thus, we have disclosed a trip valve of unique structure which serves to eliminate problems of large inertial forces upon sudden opening of the valve which tend to greatly reduce the valve life, of improper seating of the valve due to thermal distortion of the valve seat, and the problem of large dirt particles entrained in the inlet steam being passed to the valve mechanism.

It will be understood that the invention is not to be limited to the specific construction or arrangement of parts shown but that they may be widely modified within the invention defined by the claims.

I claim:
1. A trip valve for controlling the supply of fluid under pressure to a fluid-receiving means comprising:
   valve body means having a fluid chamber formed therein and an inlet passage and an outlet passage for said fluid communicating with said fluid chamber;
   valve body cover means operatively associated with said valve body means;
   valve seat means disposed in said outlet passage;
   means responsive to pressure disposed in said fluid chamber for engaging said valve seat means thereby stopping the flow of fluid to said fluid-receiving means;
   guide means disposed in said fluid chamber about said means responsive to pressure for guiding the vertical travel thereof;
   said guide means including means for snubbing the vertical travel of said means responsive to pressure; and means for biasing said means responsive to pressure away from said valve seat means, thereby allowing the flow of fluid to said fluid receiving means.

2. The combination of claim 1 wherein said means responsive to pressure for engaging said valve seat means comprises:
valve stem means disposed in said fluid chamber;
piston head means disposed about said stem on the upper end thereof for vertical movement with said stem; and
valve head means disposed about said valve stem on the lower end thereof for vertical movement with said stem, axially displaced from said piston head means, for engaging said valve seat, thereby stopping the flow of fluid to said fluid-receiving means.

3. The combination of claim 2 wherein said valve head means is disposed about said valve stem on a pivoting center thus allowing said valve head means to move angularly with respect to the stem axis.

4. The combination of claim 2 wherein said means for biasing means responsive to pressure off said valve seat means, is a vertically extending spring disposed about said valve stem means coacting with the lower face of said piston head means at one end and said guide means at the other end.

5. A trip valve for controlling the supply of fluid under pressure to a fluid receiving-means comprising:
valve body means having a fluid chamber formed therein and an inlet passage and an outlet passage for said fluid communicating with said fluid chamber;
valve body cover means operatively associated with said valve body means;
valve seat means disposed in said outlet passage;
means responsive to pressure disposed in said fluid chamber for engaging said valve seat means thereby stopping the flow of fluid to said fluid receiving means;
guide means disposed in said fluid chamber about said means responsive to pressure for guiding the vertical travel thereof;
means for biasing said means responsive to pressure away from said valve seat means, thereby allowing the flow of fluid to said fluid-receiving means;
said means responsive to pressure for engaging said valve means comprising valve stem means disposed in said fluid chamber;
piston head means disposed about said stem on the upper end thereof for vertical movement with said stem;
valve head means disposed about said valve stem on the lower end thereof for vertical movement with said stem, axially displaced from said piston head means, for engaging said valve seat, thereby stopping the flow of fluid to said fluid-receiving means; and
said guide means having an annular recess formed therein, symmetrical about the vertical axis of said valve stem means, dimensioned to receive said valve head means in the normally open position, said annular recess communicating with said fluid chamber whereby upon sudden movement vertically upward of said valve stem means said fluid becomes entrapped between said valve head means and said annular recess thereby slowing the vertical travel of said valve stem means.

6. The combination of claim 5 wherein said valve body cover means has a piston head cylinder means formed therein dimensioned to receive said piston head means in slidable engagement.

7. The combination of claim 6 including means to transmit the fluid pressure in said fluid chamber to the lower face of said piston head means and means to transmit the fluid pressure in said fluid chamber to the upper face of said piston head means with the valve in the open position thereby balancing the pressure on both piston faces.

8. The combination of claim 7 wherein said means to transmit the fluid pressure in said fluid chamber to the lower face of said piston head means is a small radial clearance between said valve stem means and said guide means.

9. The combination of claim 7 wherein said means to transmit the fluid pressure in said fluid chamber to the upper face of said piston head means is a bore extending through said valve stem means the vertical length thereof.

10. The combination of claim 7 including means to reduce the pressure on the lower face of said piston head means below that existing on the upper face of said piston head means under adverse operating conditions thereby causing a downward movement of said piston head means, said valve stem means and said valve head means, causing said valve head means to engage said valve seat means thereby stopping the flow of fluid to said fluid-receiving means.

11. The combination of claim 10 wherein said means to reduce the pressure on the lower face of said piston head means is a normally closed pilot valve operatively associated with said pressure on the lower face of said piston head means whereby on opening of said pilot valve said pressure will be relieved.

12. The combination of claim 11 wherein said means to transmit the fluid pressure in said fluid chamber to the lower face of said piston head means is a small radial clearance between said valve stem means and guide means.

13. The combination of claim 12 wherein said means to transmit the fluid pressure in said fluid chamber to the upper face of said piston head means is a bore extending through said valve stem means the vertical length thereof.

14. The combination of claim 13 wherein said means for biasing said means responsive to pressure off said valve seat means is a vertically extending spring disposed about said valve stem means coacting with the lower face of said piston head means at one end and said guide means at the other end.

15. The combination of claim 1 including means to manually control the vertical position of said means responsive to pressure thereby throttling the flow of said fluid.

16. The combination of claim 15 wherein said means to manually control the vertical position of said means responsive to pressure comprises a jackshaft extending through said valve body cover means into said fluid chamber having a hand wheel disposed about the upper end thereof for advancing said jackshaft whose other end is in contacting relationship with said means responsive to pressure.

17. The combination of claim 16 wherein said means responsive to pressure for engaging said valve seat means comprises:
valve stem means disposed in said fluid chamber;
piston head means disposed about said valve stem on the upper end thereof for vertical movement with said stem; and
valve head means disposed about said valve stem on the lower end thereof for vertical movement with said stem, axially displaced from said piston head means.

18. A trip valve for controlling the supply of fluid under pressure to a fluid-receiving means comprising:
valve body means having a fluid chamber formed therein and an inlet passage and an outlet passage for said fluid communicating with said fluid chamber;
valve body cover means operatively associated with said valve body means;
valve seat means disposed in said outlet passage;
means responsive to pressure disposed in said fluid chamber for engaging said valve seat means thereby stopping the flow of fluid to said fluid-receiving means;
guide means disposed in said fluid chamber about said means responsive to pressure for guiding the vertical travel thereof;
means for biasing said means responsive to pressure off said valve seat means, thereby allowing the flow of fluid to said fluid receiving means;
means to manually control the vertical position of said means responsive to pressure thereby throttling the flow of said fluid;
said manually control means comprising a jackshaft extending through said valve body cover means into said fluid chamber having a hand wheel disposed about the upper end thereof for advancing said jackshaft whose other end is in contacting relationship with said means responsive to pressure;

said means responsive to pressure for engaging said valve seat means comprises:
valve stem means disposed in said fluid chamber,
piston head means disposed about said valve stem on the upper end thereof for vertical movement with said stem,
valve head means disposed about said valve stem on the lower end thereof for vertical movement with said stem, axially displaced from said piston head means; and
said guide means having an annular recess formed therein symmetrical about the vertical axis of said valve stem means, dimensioned to receive said valve head means in the normally-open position when said jackshaft is fully withdrawn from said fluid chamber, said annular recess communicating with said fluid chamber whereby upon sudden movement vertically upward of said valve stem means said fluid becomes entrapped between said valve head means and said annular recess thereby slowing the vertical travel of said valve stem means.

19. The combination of claim 18 wherein said valve body cover means has a piston head cylinder means formed therein dimensioned to receive said piston head means in slidable engagement.

20. The combination of claim 19 including means to transmit the fluid pressure in said fluid chamber to the lower face of said piston head means and means to transmit the fluid pressure in said fluid chamber to the upper face of said piston head means with the valve in the open position thereby balancing the pressure on both piston faces.

21. The combination of claim 20 wherein said means to transmit the fluid pressure in said fluid chamber to the lower face of said piston head means is a small radial clearance between said valve stem means and said guide means.

22. The combination of claim 20 wherein said means to transmit the fluid pressure in said fluid chamber to the upper face of said piston head means comprises:
an axial bore in said valve stem communicating at one end with said fluid chamber and at the other end with a radial bore in said valve stem;
an annular recess formed on said valve stem communicating with said radial bore in said valve stem; and
means formed in said piston head communicating with said annular recess formed on said valve stem for transmitting said fluid pressure to the upper face of said piston head.

23. The combination of claim 20 including means to reduce the pressure on the lower face of said piston head means below that existing on the upper face of said piston head means under adverse operating conditions thereby causing a downward movement of said piston head means, said valve stem means, and said valve head means, causing said valve head means to engage said valve seat means thereby stopping the flow of fluid to said fluid receiving means.

24. The combination of claim 23 wherein said means to reduce the pressure on the lower face of said piston head means is a normally closed pilot valve operatively associated with said pressure on the lower face of said piston head means whereby on opening of said pilot valve said pressure will be relieved.

25. The combination of claim 24 wherein said means to transmit the fluid pressure in said fluid chamber to the lower face of said piston head means is a small radial clearance between said valve stem means and said guide means.

26. The combination of claim 25 wherein said means to transmit the fluid pressure in said fluid chamber to the upper face of said piston head means comprises:
an axial bore in said valve stem communicating at one end with said fluid chamber and at the other end with a radial bore in said valve stem;
an annular recess formed on said valve stem communicating with said radial bore in said valve stem; and
means formed in said piston head communicating with said annular recess formed on said valve stem for transmitting said fluid pressure to the upper face of said piston head.

27. The combination of claim 26 including means operatively associated with said jackshaft for advancement therewith, disposed within said valve body cover, having an annular recess formed therein symmetrical about the vertical axis of said valve stem means, dimensioned to receive said piston head means whereby upon sudden movement vertically upward of said valve stem means said fluid becomes entrapped between said piston head means and said annular recess thereby slowing the vertical travel of said valve stem means when said jackshaft is not fully withdrawn from said fluid chamber.

28. A valve assembly for controlling the flow of fluid under pressure comprising:
a housing having an inlet and an outlet;
a valve seat interposed between said inlet and said outlet;
a valve stem disposed in said housing for reciprocating movement;
a piston connected to one end of said stem and defining a chamber in said housing at the side of said piston toward said valve seat;
valve means connected to the other end of said stem and engageable with said seat;
passage means for normally equalizing fluid pressure on opposite sides of said piston;
spring means for biasing said valve means away from said valve seat;
means responsive to adverse operating conditions for generating a signal force; and
means responsive to said signal force including passage means for venting said chamber to rapidly reduce the pressure therein and move said piston against said spring means under fluid pressure at the opposite side of said piston thus causing said valve means to engage said seat and interrupt the flow of fluid under pressure to said outlet.

29. A valve assembly according to claim 28 together with means for manually controlling movement of said valve means relative to said seat.

30. A valve assembly according to claim 28 including strainer means in said housing for preventing the ingress of dirt and other foreign matter into said chamber, said valve means and said outlet.

31. A valve assembly according to claim 28 including means for snubbing the vertical travel of said valve means.